US012638341B2

(12) United States Patent
Rothmund et al.

(10) Patent No.: US 12,638,341 B2
(45) Date of Patent: May 26, 2026

(54) TEMPERATURE MEASUREMENT ARRANGEMENT IN A POWER MODULE

(71) Applicant: ABB E-mobility B.V., Delft (NL)

(72) Inventors: Daniel Rothmund, Mülligen (CH); Francisco Canales, Baden-Dättwil (CH); Sami Pettersson, Dietikon (CH); Daniel Christen, Uster (CH); Piotr Pawel Czyz, Zürich (CH); Marcin Knafel, Cracow (PL)

(73) Assignee: ABB E-Mobility B.V., Delft (NL)

( * ) Notice: Subject to any disclaimer, the term of this patent is extended or adjusted under 35 U.S.C. 154(b) by 343 days.

(21) Appl. No.: 18/354,042

(22) Filed: Jul. 18, 2023

(65) Prior Publication Data

US 2024/0019315 A1     Jan. 18, 2024

(30) Foreign Application Priority Data

Jul. 18, 2022     (EP) ..................................... 22185530

(51) Int. Cl.
| *G01K 7/22* | (2006.01) |
| *H01C 7/00* | (2006.01) |
| *H01C 7/04* | (2006.01) |

(52) U.S. Cl.
CPC .............. *G01K 7/22* (2013.01); *H01C 7/008* (2013.01); *H01C 7/04* (2013.01)

(58) Field of Classification Search
None
See application file for complete search history.

(56) References Cited

U.S. PATENT DOCUMENTS

| 6,129,673 | A | * | 10/2000 | Fraden | ...................... | G01J 5/16 |
| | | | | | | 600/549 |
| 9,010,999 | B2 | | 4/2015 | Schuler | | |
| 9,989,927 | B1 | | 6/2018 | Caffee | | |
| 10,393,601 | B2 | | 8/2019 | Smerzi | | |
| 10,948,359 | B2 | | 3/2021 | Strzalkowski | | |
| 2004/0062291 | A1 | * | 4/2004 | Watanabe | ................ | F01P 11/16 |
| | | | | | | 374/144 |
| 2008/0008266 | A1 | * | 1/2008 | Kamali | .................... | H03H 7/54 |
| | | | | | | 375/316 |
| 2022/0018720 | A1 | * | 1/2022 | Tulane | ..................... | G01K 7/22 |

(Continued)

FOREIGN PATENT DOCUMENTS

| CN | 208902298 U | 5/2019 |
| CN | 110044510 A | 7/2019 |
| CN | 110595513 A | 12/2019 |

(Continued)

OTHER PUBLICATIONS

Narayana et al., "Development of an Intelligent Temperature Transducer," *IEEE Sensors J.*, 16(12): 4696-4703 (Jun. 15, 2016).

(Continued)

*Primary Examiner* — Erica S Lin
(74) *Attorney, Agent, or Firm* — McCarter & English, LLP; Michael M. Gnibus

(57) ABSTRACT

A temperature measurement arrangement for measuring a temperature in a noise voltage-inducing environment includes a sensing circuit including a Negative Temperature Coefficient Thermistor (NTC) for sensing a temperature and a filter for compensating the induced noise voltage at a filter frequency.

14 Claims, 6 Drawing Sheets

(56)        References Cited

U.S. PATENT DOCUMENTS

2022/0211113 A1 *    7/2022   Ruscio ................... A24F 40/20

FOREIGN PATENT DOCUMENTS

| | | | |
|---|---|---|---|
| CN | 110864798 | A | 3/2020 |
| CN | 213780337 | U | 7/2021 |
| CN | 113253084 | A | 8/2021 |
| CN | 215865544 | U | 2/2022 |
| EP | 0910870 | B1 | 5/2008 |
| EP | 3208586 | B1 | 8/2019 |
| GB | 2322709 | B | 11/2000 |
| WO | WO 2021/119989 | A1 | 6/2021 |
| WO | WO 2021/182012 | A1 | 9/2021 |
| WO | WO 2021/199418 | A1 | 10/2021 |

OTHER PUBLICATIONS

Natarajan et al., "Temperature-to-Time Converters," *IEEE Transactions on Instrumentation and Measurement*, 26(1): 77-79 (Mar. 1977).

Stankovic et al., "Thermistor Multivibrator as the Temperature-to-Frequency Converter and as a Bridge for Temperature Measurement," *IEEE Transactions on Instrumentation and Measurement*, 26(1): 41-46 (Mar. 1977).

Natarajan, "Widely Linear Temperature-to-Frequency Converters," *IEEE Transactions on Instrumentation and Measurement*, IM-24(3): 235-239 (Sep. 1, 1975).

European Patent Office, Extended European Search Report in European Patent Application No. 22185530.7, 12 pp. (Apr. 5, 2023).

European Patent Office, Partial European Search Report in European Patent Application No. 22185530.7, 14 pp. (Jan. 19, 2023).

* cited by examiner

700

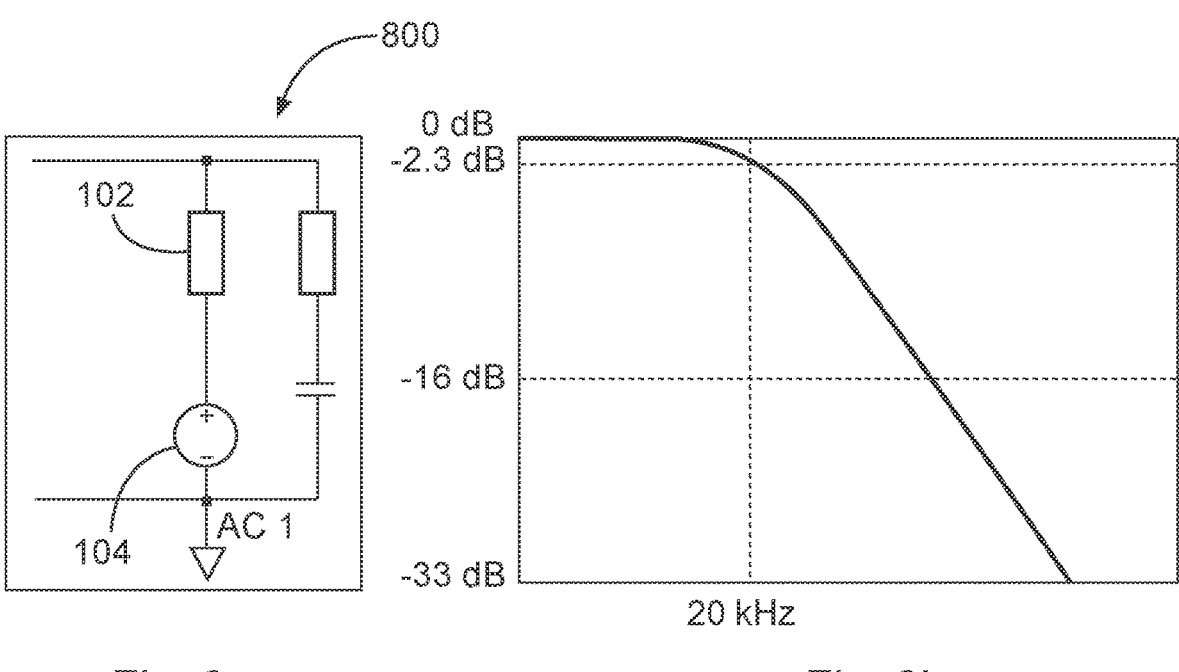
Fig. 8a                                Fig. 8b
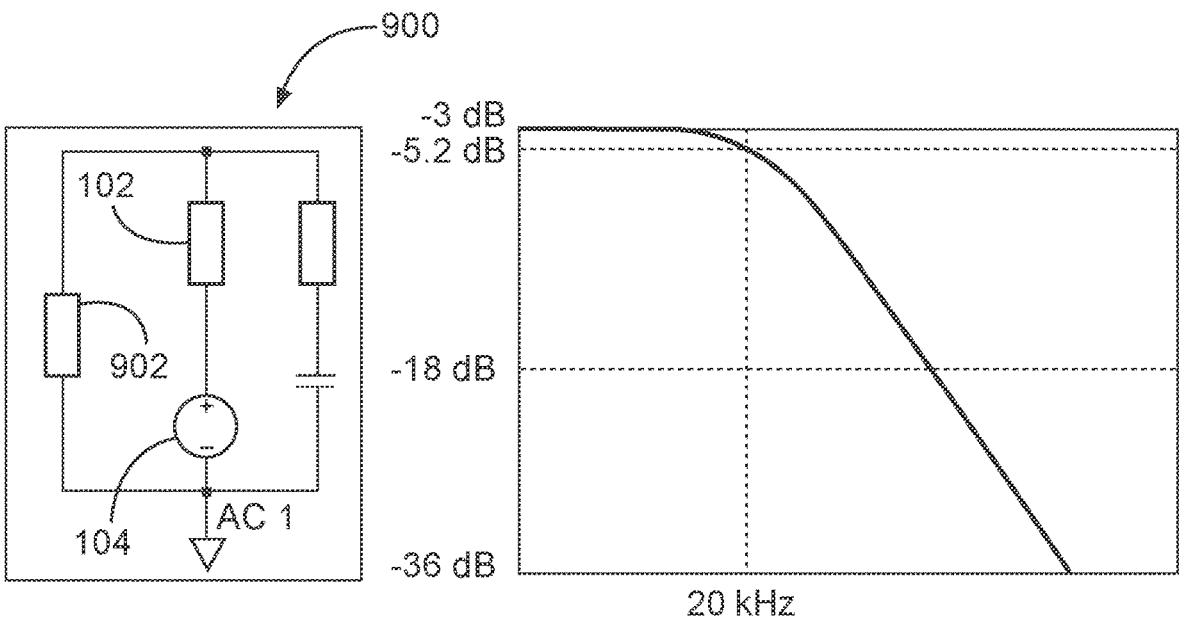
Fig. 9a                                Fig. 9b

TEMPERATURE MEASUREMENT ARRANGEMENT IN A POWER MODULE

CROSS-REFERENCE TO RELATED APPLICATIONS

The instant application claims priority to European Patent Application No. 22185530.7, filed Jul. 18, 2022, which is incorporated herein in its entirety by reference.

FIELD OF THE DISCLOSURE

The present disclosure generally relates to a temperature measurement arrangement for measuring a temperature in a noise voltage-inducing environment such as a power module with switched semiconductors, a power module and a usage of a notch filter.

BACKGROUND OF THE INVENTION

For monitoring reasons and, for example, also for loss measurements, the temperature of semiconductor dies inside a power module is of high interest. For this reason, usually, an NTC is directly integrated on the substrate, preferably close to the semiconductor dies in order to estimate their temperature as accurately as possible. The close thermal coupling of the NTC to the semiconductor dies comes with a price, namely a significant magnetic coupling between the power loop and the loop that is spanned by the bond wires between the NTC and its terminals. Due to this magnetic coupling, a switching-frequent voltage proportional to the dI/dt in the power path is induced along the bond wires of the NTC. This voltage can be of a significant amplitude and is superimposed on the measurement. The induced voltage is in the same range as the voltage used to measure the NTC's resistance. Therefore, and independently of the measurement method, the measurement is typically strongly distorted and of poor accuracy during operation of the power device.

BRIEF SUMMARY OF THE INVENTION

There may be a desire to provide an arrangement that improves the temperature measurement. The described embodiments pertain to the temperature measurement arrangement for measuring a temperature in a noise voltage inducing environment, a power module and a usage of a notch filter. Synergetic effects may arise from different combinations of the embodiments although they might not be described in detail.

Technical terms are used by their common sense. If a specific meaning is conveyed to certain terms, definitions of terms will be given in the following in the context of which the terms are used.

BRIEF DESCRIPTION OF THE SEVERAL VIEWS OF THE DRAWING(S)

FIG. 7b shows a diagram of the frequency response of the sensing circuit depicted in FIG. 7a.

FIG. 8a shows a schematic of a sensing circuit without a filter in accordance with the disclosure.

FIG. 8b shows a diagram of the frequency response of the sensing circuit depicted in FIG. 8a.

FIG. 9a shows a schematic of a sensing circuit with a parallel resistor in accordance with the disclosure.

FIG. 9b shows a diagram of the frequency response of the sensing circuit depicted in FIG. 9a.

DETAILED DESCRIPTION OF THE INVENTION

Corresponding parts are provided with the same reference symbols in all figures.

Figure 1:
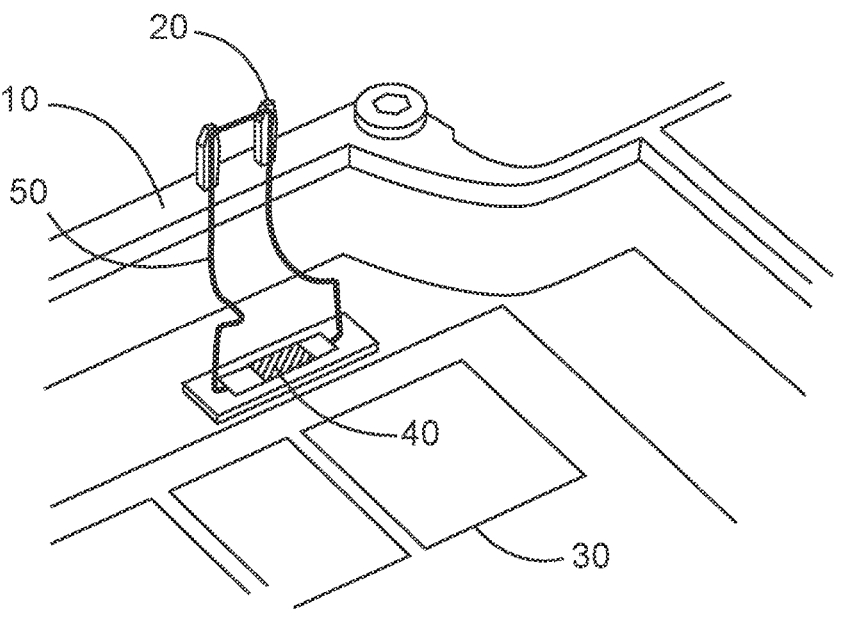
FIG. 1 shows a sketch of a power module in accordance with the disclosure.

FIG. 1 shows a sketch of a power module 10 with electronic components including power components such as semiconductor dies 30. A temperature sensor 40, such as a Negative Temperature Coefficient Thermistor (NTC) is arranged inside the power module 10. The NTC 40 is bonded to a substrate inside the power module 10 and bond wires 50 are lead to the terminals 20. Consequently, a magnetic coupling arises between the power loop defined by the devices and connections, through which high currents are running and the loop that is spanned by the bond wires 50 between the NTC 40 and the terminals 20. Due to this magnetic coupling, a switching-frequent voltage proportional to the dI/dt in the power path is induced along the bond wires 50 of the NTC 40. The amplitude of this voltage can be significant, for example about 500 mV. This voltage is superimposed on the measurement. Due to a dissipation limit inside the NTC of typically 20 mW, the voltage across the NTC is limited to about 1V, so that the induced voltage is in the same range as the voltage used to measure the NTC's resistance distorting the measurement. Therefore, the environment in which the temperature measurement arrangement is located is a noise voltage-inducing environment, caused by the magnetic coupling.

Figure 2:
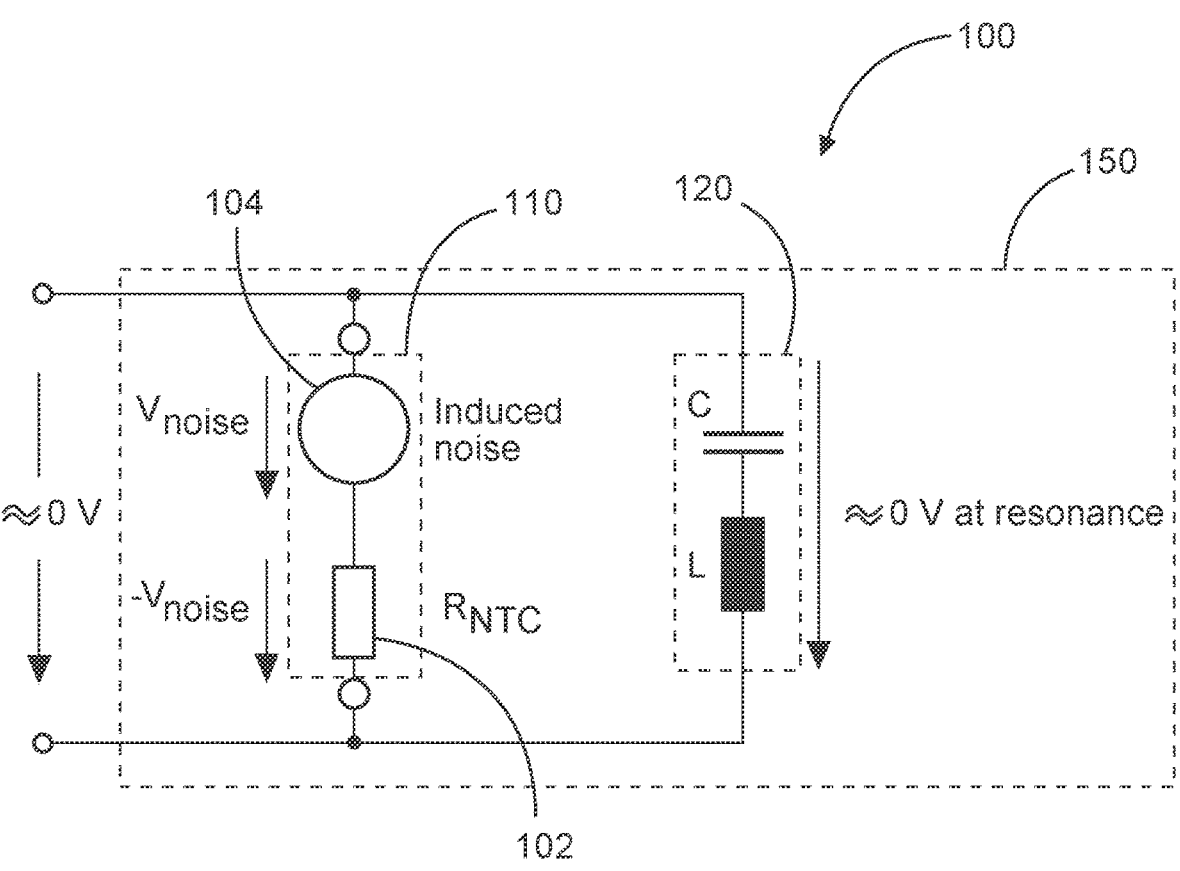
FIG. 2 shows a schematic of the sensing circuit including an NTC resistor in accordance with the disclosure.

A temperature measurement arrangement 100 that compensates the induced noise voltage in such an environment is shown in FIG. 2. The temperature-sensing device is a resistor R_NTC 102, which is subject to the induced noise voltage, resulting in the NTC arrangement 110 including the noise voltage source 104. As already explained, the noise voltage is switching-frequent. That is, the power devices 30, for example, semiconductors such as IGBTs, MOSFETs, etc., are switched at a certain frequency, for example 20 kHz, which causes the induced voltage. This induced noise voltage has as spectrum with a main peak at the same frequency, i.e., 20 kHz in this example. The noise voltage can be considered as noise voltage source 104 in series with the NTC, since it superimposes the actual voltage caused by the measurement current and the temperature dependent resistance of the NTC 102.

Figure 3:
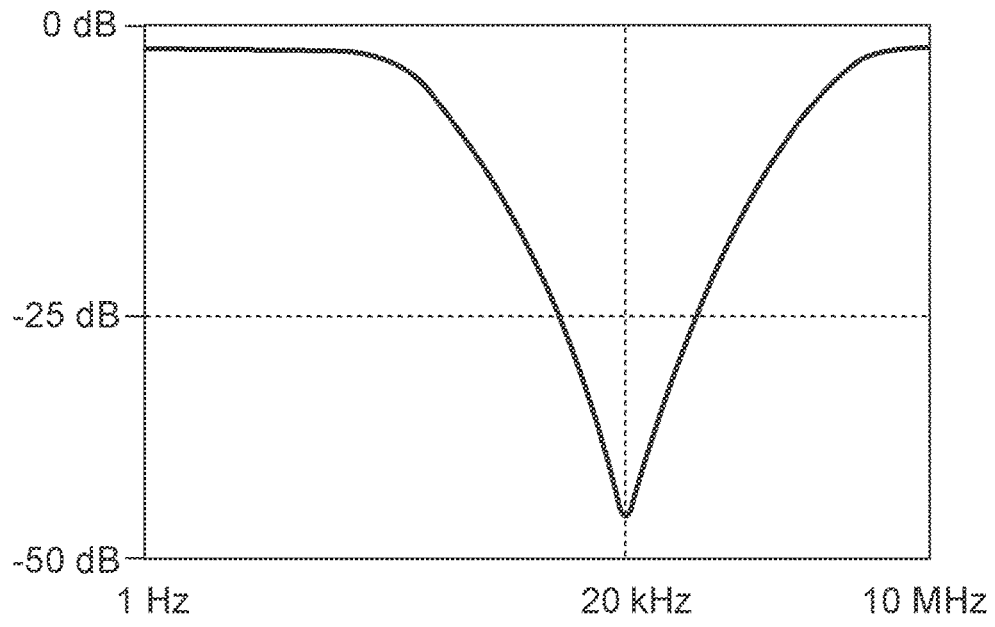
FIG. 3 shows a diagram of the frequency response of a notch filter in accordance with the disclosure.

For short-circuiting the induced voltage at least at the switching frequency, the filter 120 is arranged in parallel to the terminals 20 of the NTC. The type of filter suitable for this task is therefore a notch filter 120 as shown in FIG. 2. An example of the frequency response of a notch filter with a resonance frequency at 20 kHz is shown in FIG. 3. For the noise voltage frequency, the notch filter 120 represents a very low impedance, which would be ideally 0 Ohms, but which is practically limited to the parasitic series resistance of the capacitor C and inductor L. That is, the filter 120 short-circuits or nearly short-circuits the voltage of the series arrangement of NTC 102 and induced voltage represented by the noise voltage source 104 at the noise frequency, which is typically the switching frequency. The induced voltage is thus compensated at this frequency. In embodiments, the filter has further resonance frequencies.

Due to this, the noise voltage V_noise is negatively applied to the NTC resistance and the voltage that is measured at the module terminals, which is the sum of the noise source 104 and the voltage across the NTC resistance 102, is therefore close to zero. Independently of the circuit that is used to measure the NTC resistance 102.

Alternatively, a low-pass filter would also be possible, which lets pass only frequencies below the switching frequency. Further, instead of a single notch filter, a second notch filter in parallel to the notch filter may be applied. In this way, also other components of the spectrum of the induced noise voltage can be considered.

The notch filter in FIG. 2 consists of a capacitor and an inductor. Depending on the requirements, e.g., width and slope of the frequency response of the filter, a more complex arrangement may be implemented.

Figure 4:
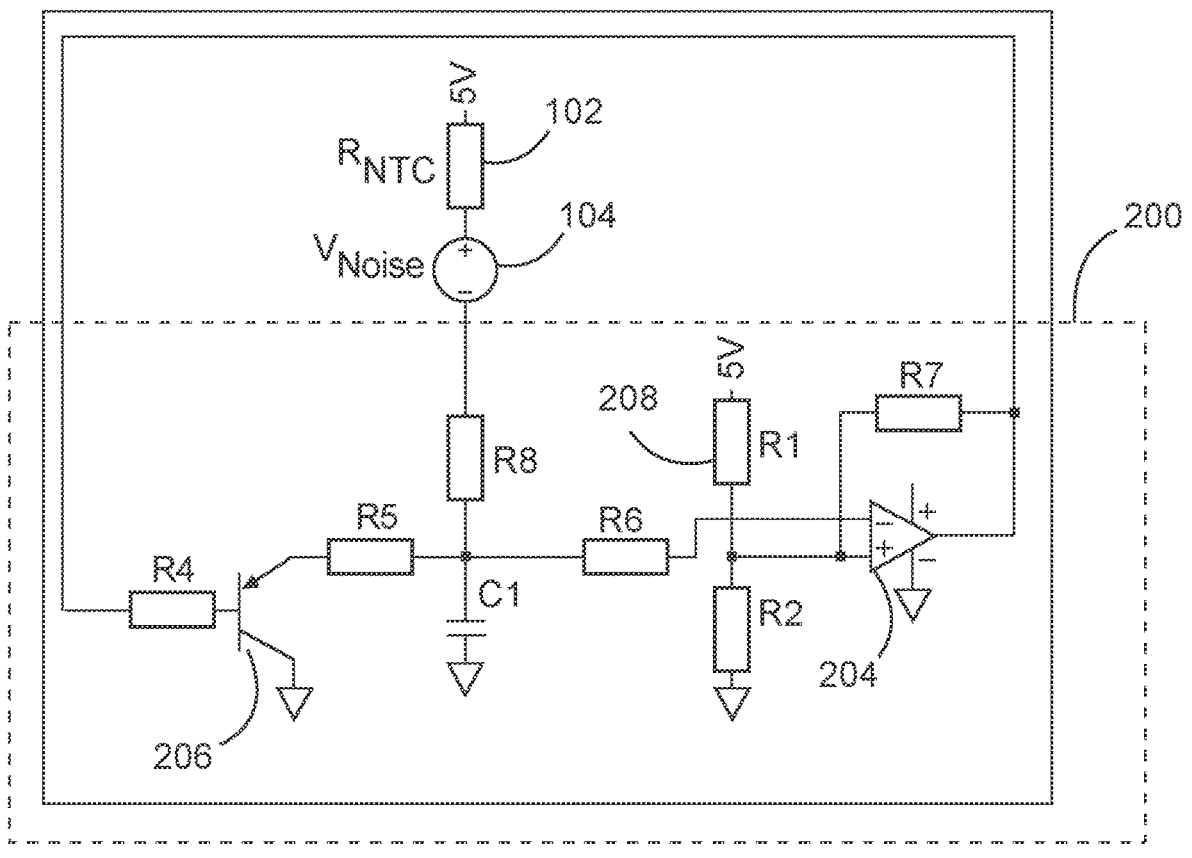
FIG. 4 shows a schematic of the resistance-to-frequency converter in accordance with the disclosure.

FIG. 4 shows a schematic of the resistance-to-frequency converter 200, which is in an embodiment used as one measurement instance or evaluation instance of the entire temperature measurement arrangement. The resistance-to-frequency converter 200 uses a comparator 204 and a bipolar transistor 206, in this case a pnp transistor, as active elements. The bias resistor R1, 208, is used to narrow down the frequency range. The charging time of timing capacitor C1 is responsible for the measurement frequency. Its capacity and the temperature dependent resistance of the NTC 102 determine the charging time up to a voltage value equal to the reference voltage value of the comparator 204. The noise source is again represented as serial voltage source 104. The further elements in the schematics represent circuits for realizing the voltage comparison by comparator 204 and the discharging of the timing capacitor C1. For example, the circuit for realizing the comparator 204 consists of the voltage divider R1, R2 for providing the reference voltage at the inverting input of the comparator 204, the current limiting resistor R6 for limiting the input current into the comparator 204, and a feedback resistor R7. The circuit for realizing the discharging the timing capacitor C1 consists of the bipolar pnp transistor 206 with current limiting resistors R5 at the emitter of the pnp transistor 206 and R4 at the base of the transistor 206. The transistor 206 is switched for discharging by applying the output voltage of comparator 204 to the base of transistor 206 via resistor R4. Resistor 208, also designated as R1 in FIG. 4, is used for narrowing down frequency range of the measurement frequency, i.e., the output frequency of the resistance-to-frequency converter 200.

Figure 5:
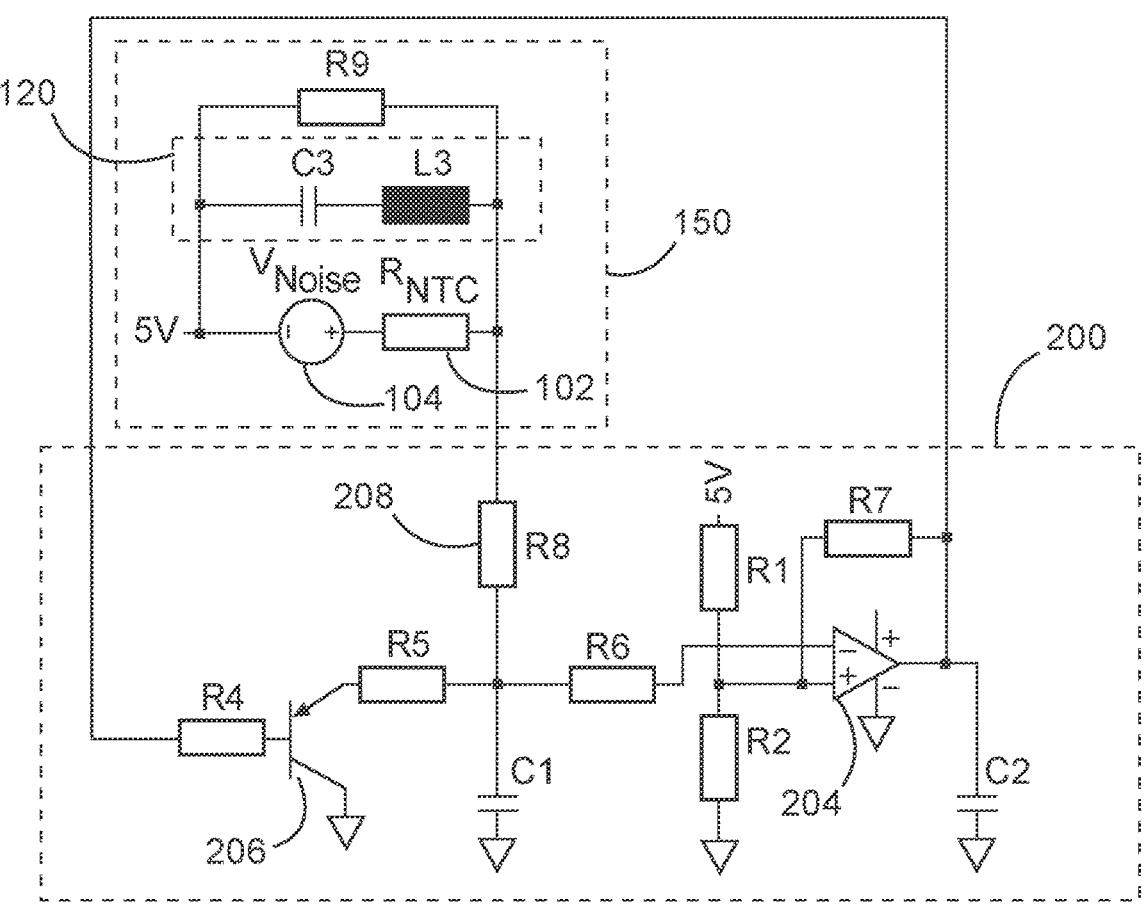
FIG. 5 shows a schematic, in which the resistance-to-frequency converter is applied to the sensing circuit in accordance with the disclosure.

FIG. 5 shows a schematic in which the resistance-to-frequency converter 200 is applied to the sensing circuit 150 that includes the NTC 102, the serial voltage source 104, and the notch filter 120. The timing capacitor C1 is charged by the current through NTC 102 and R8, which depends on the supply voltage, e.g., 5V plus V_noise 104 and the value of R8. The output frequency corresponding to the temperature sensed by the NTC 120 is provided at capacitor C2 that represents, e.g., an oscilloscope probe and/or the input capacitance of a microcontroller's pin for detecting the measurement frequency.

Figure 6:
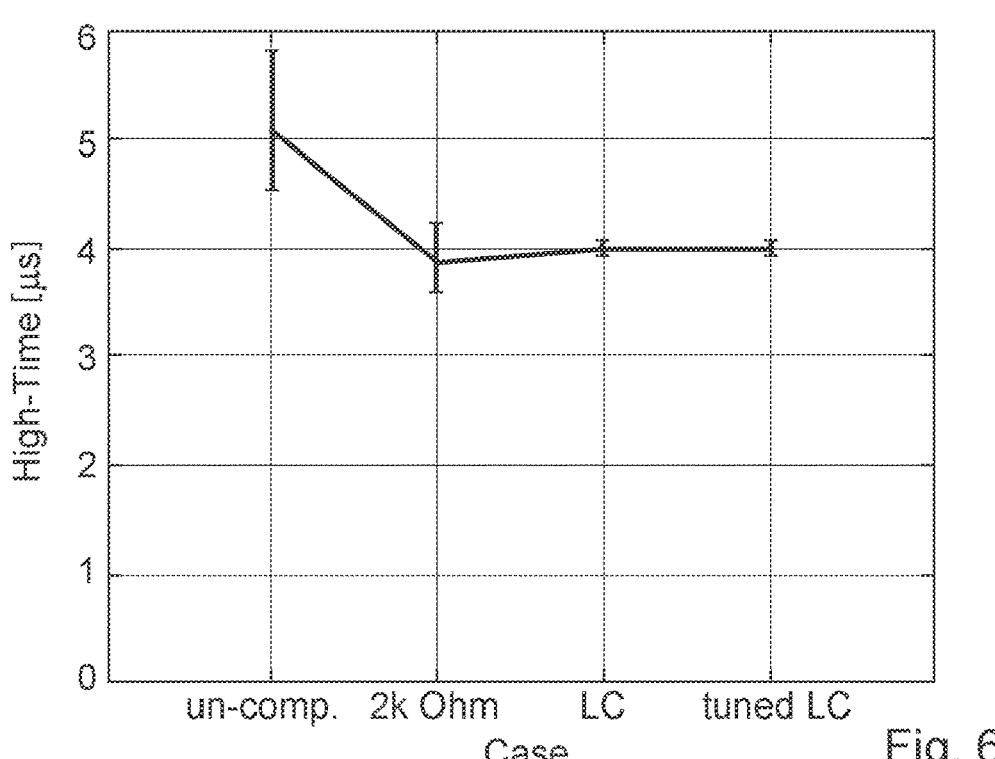
FIG. 6 shows a diagram with the charging time of the timing capacitor for the different cases in accordance with the disclosure.

FIG. 6 shows a diagram with the charging time of the timing capacitor C1 for the different cases together with their error markers. The LC notch filter is clearly leading to very small errors compared to the uncompensated or the resistively compensated cases.

Figure 7A:
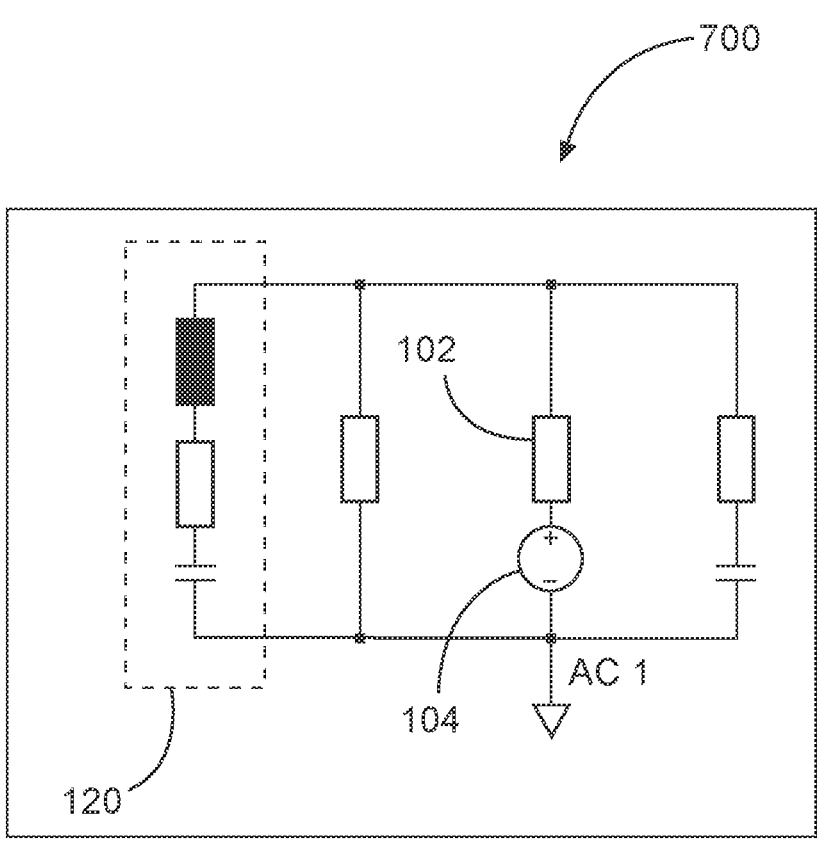
FIG. 7a shows a schematic of a sensing circuit with a notch filter in accordance with the disclosure.

FIG. 7a shows a schematic of sensing circuit 700 corresponding to the sensing circuit 150 with a notch filter 120 realized by an LC series connection.

Figure 7B:
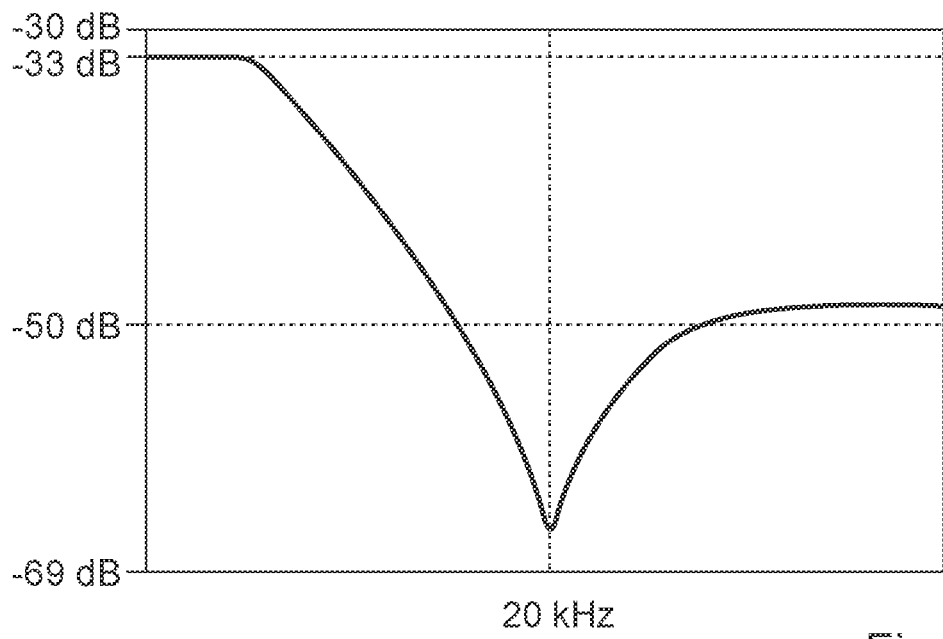

FIG. 7b shows a diagram of the frequency response of the sensing circuit 700 corresponding to the sensing circuit 150 with the notch filter 120 as shown in FIG. 7a according to a simulation. The damping at the switching frequency 20 kHz is higher than 65 dB.

The results of the sensing circuit 150 with the notch filter 120 are compared to a sensing circuit 800 without compensation as shown in the schematics depicted in FIG. 8a and a sensing circuit 900 with a resistor 902 as compensating element as shown in the schematics depicted in FIG. 9a. FIGS. 8b and 9b show the respective frequency responses. In case of no compensation, the damping at 20 kHz is 2.3 dB, and in case of having a resistor 902 as compensating element, the damping at 20 kHz is 5.2 dB.

Figures 10A, 10B, 10C:
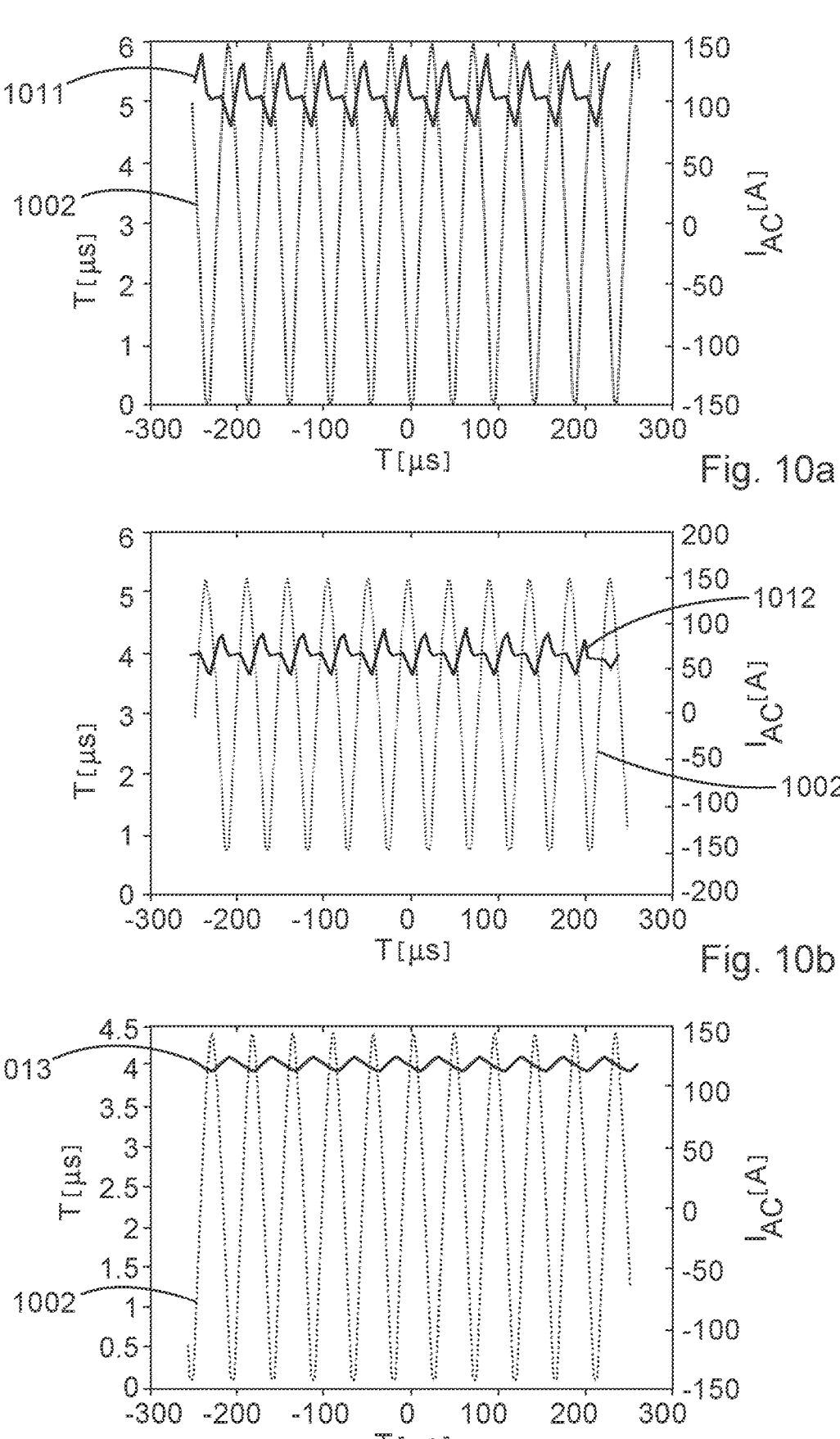
FIG. 10a shows the charging time of the timing capacitor without compensation in accordance with the disclosure.
FIG. 10b shows the charging time of the timing capacitor with a resistor as filter in accordance with the disclosure.
FIG. 10c shows the charging time of the timing capacitor with a notch filter in accordance with the disclosure.

FIGS. 10a, 10b, and 10c show the influence of the power path current on the charging time of the capacitor, which is used as a measure for the NTC resistance. In the Figures, the switching signal LAC 1002 of the power devices 30 in the power module 10 is represented by the dotted curves. The amplitude is +/-150 A. FIG. 10a shows the charging time 1011 of the timing capacitor C1 without compensation. FIG. 10b shows the charging time 1012 of the timing capacitor with a resistor 902 as filter, and FIG. 10c shows the charging time 1012 of the timing capacitor C1 with a notch filter 120.

It is evident that the notch filter compensation shown in FIG. 10c reduces the measurement noise significantly compared to a 2 kOhm compensation as shown in FIG. 10b, which again shows a reduced measurement noise compared to no compensation as shown in FIG. 10a.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

According to an aspect, a temperature measurement arrangement for measuring a temperature in a noise voltage-inducing environment is provided. The temperature measurement arrangement comprises a sensing circuit including a Negative Temperature Coefficient Thermistor (NTC) for sensing a temperature; and a filter for compensating the induced noise voltage at a filter frequency.

The temperature measurement arrangement is an electrical circuit that comprises means to sense a temperature in the noise voltage-inducing environment. Herein, these means include a NTC that senses the temperature by changing its resistance in dependence on the temperature. In a noise voltage-inducing environment, the NTC is subject to a voltage superimposed to the voltage at the NTC, for example, the supply voltage for the NTC. More specifically, the bond wires from the solder points of the NTC to the terminals of the NTC form a loop through which flows a magnetic field that changes with time and induces the noise voltage. The magnetic field is caused by switched power devices nearby the loop formed by the bond wires. The noise voltage therefore has at least a frequency component at the switching frequency. The filter may be a resistor or a frequency dependent filter that filters at least a frequency, which has the same value as the switching frequency and is implemented such that it compensates the noise voltage at this frequency. "Compensating" means neutralizing the effect of the noise voltage at least in parts, i.e., not necessarily completely. Further, the effect of the noise voltage is that the voltage at the NTC varies, leading to a higher current through the NTC and thus to a noisy measurement if the further measurement circuit uses this current for measurements and evaluation. The noise voltage is represented in this disclosure as a voltage source in the schematics.

According to an embodiment, the filter of the temperature measurement arrangement is arranged in parallel to the NTC. The filter may be arranged in parallel to the NTC. More specifically, the filter is arranged such that it is parallel to the noise voltage source and the NTC, which are not separable and which are represented as a series connection in an equivalent circuit diagram. According to an embodiment, the filter is a notch filter.

The notch filter filters one distinct frequency, which in this case is the switching frequency of the power devices. In other words, the notch filter has a low impedance, ideally zero, at the switching frequency thereby short-circuiting, or nearly short-circuiting the series connection of the NTC and the noise voltage source.

According to an embodiment, the temperature measurement arrangement further comprises a resistance-to-frequency converter, and wherein the sensing circuit is connected to the resistance-to-frequency converter for measuring a frequency corresponding to a resistance value of the NTC.

That is, a known relation between a value of the NTC and the frequency is used to measure the temperature. The filtering is effective when using a resistance-to-frequency converter. As explained below in more detail, the resistance-to-frequency converter is realized for example by charging a timing capacity. The timing capacity is charged by the current dependent on the current value of the NTC. If the voltage at the timing capacity is "high", a comparator changes its output voltage and discharges the capacity again using, for example, a further active semiconductor. If the supply voltage of the NTC is not constant, which is the case here due to the superimposed noise voltage, the current for charging the timing capacitor is influenced leading to a noisy or even wrong or biased measurement.

According to an embodiment, the temperature measurement arrangement further comprises a voltage divider or a Wheatstone bridge for measuring the resistance value of the NTC.

A voltage divider or a Wheatstone bridge are alternative circuits that may be used for measuring the resistance value of the NTC. The filter is connected in parallel to the resistor to be measured, that is, the NTC including the unwanted voltage noise source.

These alternative measurement circuits are simpler to realize, however their output signal is still analog and needs to be digitalized while the resistance-to-frequency converter directly generates a digital output signal that is more robust for transmission and easy to read in by a microprocessor or programmable logic device. Nevertheless, the filter can be applied effectively also in these cases, improving the measurement results.

According to an embodiment, the temperature measurement arrangement is integrated into a power electronic converter system.

A power electronic converter system is one application where power components are used, and the temperature is measured such that the high currents produce the noise voltage and thus the noise voltage-inducing environment.

According to an embodiment, the NTC is arranged inside a power module.

A power module is a device with a housing containing the power semiconductors and the NTC. As explained above, the switched current, which is running through the power module, i.e., through the power semiconductors generates the noise voltage-inducing environment inside the power module. The term "module" relates to a modular device.

According to an embodiment, the NTC is arranged in vicinity of a switched power semiconductor, and the NTC is connected to the resistance-to-frequency converter through bond wires.

The closer the NTC is placed to a switched power semiconductor or semiconductor die, the better the measurement becomes a representation of the actual die temperature, however at the price of higher induced noise. Using the filter as described herein therefore allows placing the NTC in even closer vicinity of a switched power semiconductor thereby maintaining or nearly maintaining the accuracy as if the NTC would be placed further away from the semiconductor die.

According to an embodiment, a switching frequency of the switched semiconductor corresponds to the resonance frequency of the filter.

"Corresponds" means that the two frequencies are the same, or nearly the same. In embodiments, "correspond" may mean further that the filter has for example additional resonance frequencies, which are harmonics of the switching frequency.

According to an embodiment, a frequency of the resistance-to-frequency converter corresponding to the resistance of the NTC differs from the switching frequency of the semiconductor by at least one decade.

A pre-requirement for the proper functionality of the measurement is that the measurement frequency and the frequency of the noise source, which is usually the switching frequency, must be significantly separated by, for example, at least one decade, i.e., at least 10 times higher than the switching frequency. In case of a voltage divider of a Wheatstone bridge, the pre-requirement of significantly separated frequencies is fulfilled automatically and the notch filter does not have any impact on the DC measurement.

If the frequencies were equal or similar, the measurement signal could hardly be distinguished from the induced noise and therefore the measurement could be biased. If the frequencies differ significantly, a remaining ripple in the measurement output can be averaged out.

According to an embodiment, resistance-to-frequency converter is connected to the sensing circuit through a connecting resistor configured to provide a current to the resistance-to-frequency converter for generating an oscillating voltage in dependence on the value of the current from the connecting resistor.

The oscillating voltage is also referred to as measurement voltage or measurement output voltage of the resistance-to-frequency converter. The timing capacitor is charged with the current from the NTC through the connecting resistor.

According to an embodiment, the resistance-to-frequency converter comprises a comparator, a bipolar transistor, and a timing capacitor. The timing capacitor is connected to the NTC and to the comparator for switching the comparator to generate the oscillating voltage, and the comparator is connected to the bipolar transistor for controlling the discharging of the timing capacitor.

That is, the resistance-to-frequency converter comprises a comparator and a bipolar transistor as active elements. The timing capacitor voltage triggers the switching of the comparator, which again controls the transistor for discharging the timing capacitor such that an oscillation is generated. The charging time of the timing capacitor is determined by the temperature dependent resistance of the NTC.

More specifically, the NTC is arranged between the supply voltage of the measurement circuit and the connecting resistor. The same applies to the filter. The connecting resistor is connected to a first terminal of the timing capacitor, whose second terminal is further connected to ground. The voltage of the timing capacitor is input to the comparator. That is, the first terminal of the timing capacitor is connected for example via a current limiting resistor to the inverting input pin of the comparator. The reference voltage of the comparator may be provided to the non-inverting input pin of the comparator and might be realized by a voltage divider. By the voltage divider, the frequency range of the measurement frequency can be limited. This may be realized using a bias resistor, which may be one of the resistors of the voltage divider providing the reference voltage.

The output of the comparator is connected to the base of a pnp transistor in order to control the discharging of the timing capacitor whose first terminal is connected to the emitter of the pnp transistor and whose collector is connected to ground. Of course, circuits fulfilling the same function may replace devices described herein, and the converter may comprise additional devices. Thus, the functionalities such as the connection between the sensing circuit and the converter, the discharging of the timing capacitor or the comparison may be realized in alternative ways that are known to a skilled person.

According to an embodiment, power module comprising a temperature measurement arrangement as described herein is provided.

According to an embodiment, the power module comprises at least one of an Insulated-Gate Bipolar Transistor (IGBT), a diode, a Silicon Carbid (SiC) MOSFET, an Integrated Gate Commutated Thyristors (IGCT), and a Galliumnitrid High-Electron-Mobility Transistor (GaN HEMT).

According to an embodiment, a usage of a notch filter in a temperature measurement arrangement as described herein is provided.

REFERENCE NUMERALS

10 Power module
20 Terminals of a Temperature sensor/NTC

30 Electronic components/power devices inside the power module
40 Temperature sensor/NTC inside the power module
50 Bond wires
100 Temperature measurement arrangement
102 NTC, R_NTC
104 Noise voltage source, V_noise
110 NTC arrangement: R_NTC including noise voltage source
120 Filter
150 Sensing circuit
200 Resistance-to-frequency converter
204 Comparator
206 Transistor, bipolar pnp transistor
208 Resistor for narrowing down frequency range
700 Sensing circuit with LC filter/notch filter
800 Sensing circuit without compensation
900 Sensing circuit with a resistor
902 Resistor of sensing circuit 900
1002 Switching signal IAC of the power devices in the power module
1011 Charging time of the timing capacitor without compensation
1012 Charging time of the timing capacitor with a resistor as filter
1013 Charging time of the timing capacitor with a notch filter All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A temperature measurement arrangement for measuring a temperature in a noise voltage-inducing environment, comprising:

a sensing circuit, the sensing circuit comprising:

a Negative Temperature Coefficient Thermistor (NTC) configured for sensing a temperature; and a filter configured for compensating an induced noise voltage at a switching frequency of a power device in a power module.

2. The temperature measurement arrangement according to claim 1, wherein the filter is arranged in parallel to the NTC.

3. The temperature measurement arrangement according to claim 1, wherein the filter is a notch filter.

4. The temperature measurement arrangement according to claim 1, wherein the temperature measurement arrangement further comprises a resistance-to-frequency converter, and wherein the sensing circuit is connected to the resistance-to-frequency converter for measuring a frequency corresponding to a resistance value of the NTC.

5. The temperature measurement arrangement according to claim 1, wherein the temperature measurement arrangement further comprises a voltage divider or a Wheatstone bridge for measuring a resistance value of the NTC.

6. The temperature measurement arrangement according to claim 1, wherein the temperature measurement arrangement is integrated into a power electronic converter system.

7. The temperature measurement arrangement according to claim 1, wherein the NTC is arranged inside the power module.

8. The temperature measurement arrangement according to claim 4, wherein the NTC is arranged in vicinity of a switched power semiconductor, and the NTC is connected to the resistance-to-frequency converter through bond wires.

9. The temperature measurement arrangement according to claim 8, wherein a switching frequency of the switched power semiconductor corresponds to a resonance frequency of the filter.

10. The temperature measurement arrangement according to claim 9, wherein a frequency of the resistance-to-frequency converter corresponding to the resistance value of the NTC differs from the switching frequency of the switched power semiconductor by at least one decade.

11. The temperature measurement arrangement according to claim 4, wherein the resistance-to-frequency converter is connected to the sensing circuit through a connecting resistor configured to provide a current to the resistance-to-frequency converter for generating an oscillating voltage in dependence on a value of a current from the connecting resistor.

12. The temperature measurement arrangement according to claim 4, wherein the resistance-to-frequency converter comprises a comparator, a bipolar transistor, and a timing capacitor; wherein the timing capacitor is connected to the NTC and to the comparator for switching the comparator to generate an oscillating voltage; and wherein the comparator is connected to the bipolar transistor for controlling discharging of the timing capacitor.

13. A power module comprising a temperature measurement arrangement, the temperature measurement arrangement comprising:

a sensing circuit, the sensing circuit including:

a Negative Temperature Coefficient Thermistor (NTC) configured for sensing a temperature; and a filter configured for compensating an induced noise voltage at a switching frequency of a power device in the power module.

14. The power module according to claim 13, wherein the power module further comprises at least one of an IGBT, a diode, a SiC MOSFET, an IGCT, and a GaN HEMT.

* * * * *